United States Patent [19]

Nakamura et al.

[11] Patent Number: 4,698,099
[45] Date of Patent: Oct. 6, 1987

[54] PIGMENT COMPOSITION

[75] Inventors: Michiei Nakamura, Soka; Hitoshi Takeuchi, Saitama; Tetujiro Takahashi; Minoru Takizawa, both of Koshigaya; Shojiro Horiguchi, Omiya, all of Japan

[73] Assignee: Dainichiseika Color & Chemicals MFG. Co., Ltd., Tokyo, Japan

[21] Appl. No.: 824,576

[22] Filed: Jan. 23, 1986

[30] Foreign Application Priority Data

Feb. 21, 1985 [JP] Japan .............................. 60-033493
Sep. 25, 1985 [JP] Japan .............................. 60-210293

[51] Int. Cl.$^4$ ............................................. C04B 14/00
[52] U.S. Cl. ............................ 106/288 R; 106/308 Q
[58] Field of Search .......... 106/287.23, 288 R, 308 Q, 106/14.12

[56] References Cited

U.S. PATENT DOCUMENTS

| | | | |
|---|---|---|---|
| 3,996,059 | 12/1976 | Stansfield et al. | 106/308 Q |
| 4,042,413 | 8/1977 | Hauxwell et al. | 106/308 N |
| 4,057,436 | 11/1977 | Davies et al. | 106/288 Q |
| 4,157,266 | 6/1979 | Hauxwell et al. | 106/308 N |
| 4,163,749 | 8/1979 | Hauxwell et al. | 106/308 N |
| 4,166,066 | 8/1979 | Hauxwell et al. | 106/308 N |
| 4,183,766 | 1/1980 | Woodward | 524/52 |
| 4,224,212 | 9/1980 | Topham | 106/308 N |
| 4,375,373 | 3/1983 | Abe et al. | 106/300 |
| 4,456,485 | 6/1984 | Iyengar | 106/308 Q |
| 4,500,362 | 2/1985 | Takahashi et al. | 106/308 Q |
| 4,518,435 | 5/1985 | Stansfield et al. | 106/308 Q |
| 4,522,654 | 6/1985 | Chisvette et al. | 106/308 Q |
| 4,526,837 | 7/1985 | Ohtsuki et al. | 427/128 |
| 4,589,922 | 5/1986 | Donegan | 106/308 Q |

Primary Examiner—Paul Lieberman
Assistant Examiner—Willie J. Thompson
Attorney, Agent, or Firm—Oblon, Fisher, Spivak, McClelland & Maier

[57] ABSTRACT

There is provided a new pigment composition composed of a pigment and a dispersant wherein the dispersant is a phosphoric ester compound represented by the formula below.

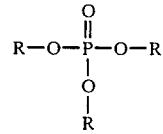

(where one or more than one of the three R's are hydroxyl-terminated polyester residues obtained by self-polycondensation of a hydroxy-carboxylic acid; and one or two of the three R's, in case of being remained, are hydrogen atoms, cations, or residues of an alcohol excluding the above-mentioned polyesters.)

6 Claims, No Drawings

PIGMENT COMPOSITION

BACKGROUND OF THE INVENTION

1. Field of the Invention:

The present invention relates a new pigment composition and, more particularly, to a pigment composition useful as a coloring material such as paint, printing ink, or a synthetic resin colorant in which a phosphonic ester compound containing a polyester chain is used as the pigment dispersant or flushing agent.

2. Description of the Prior Art:

In the conventional process for producing paints and printing inks, lecithin, which is one of phospholipids, has been used both as a dispersant for dispersing a pigment into a paint vehicle and printing ink varnish, or as a flushing agent for flushing the aqueous filter cake into an oil vehicle or oil varnish.

Being a natural phospholipid, lecithin is liable to oxidation and rancidity which lead to deterioration and putrefaction. Thus there has been a demand for a dispersant or flushing agent which is stabler and better than lecithin.

In view of the above-mentioned drawbacks of the conventional dispersant or flushing agent and in order to develop a new compound which is compatible with vehicles and varnishes and also with pigments and is useful as a pigment dispersant, the present inventors carried out a series of researches which led to the finding that a phosphoric ester obtained by reacting a polyester having a hydroxyl group with phosphoric acid exhibit outstanding properties and effects required for pigment dispersants. The present invention was completed based on this finding.

SUMMARY OF THE INVENTION

Accordingly, it is an object of the present invention to provide a pigment composition composed of a pigment and a dispersant wherein the dispersant is a phosphoric ester compound represented by the formula below.

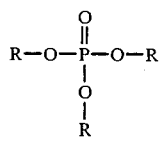

(where one or more than one of the three R's are hydroxyl-terminated polyester residues obtained by self-polycondensation of a hydroxy-carboxylic acid; and one or two of the three R's in case of being remained, are hydrogen atoms, cations, or residues of an alcohol excluding the above-mentioned polyesters.)

DETAILED DESCRIPTION OF THE INVENTION

The dispersant which characterizes the pigment composition of this invention is a specific phosphoric ester compound as defined above.

The phosphoric ester compound used in this invention can be obtained by various methods. According to a preferred method, it is obtained by reacting 1 mole of an ester-forming phosphorus compound with 3 moles, 2 moles, or 1 mole of a hydroxyl-terminated polyester (obtained by self-polycondensation of a hydroxy-carboxylic acid.)

It is also possible to produce the phosphoric ester compound used in this invention by the process is which 1 mole of an ester-forming phosphorus compound is reacted with 1 to 3 moles of hydroxy-carboxylic acid or lower alcohol ester thereof as a monomer and the resulting ester of phosphoric acid and hydroxy-carboxylic acid undergoes chain growth with the same or different hydroxy-carboxylic acid monomer and/or hydroxyl-terminated polyester.

When 1 mole of an ester-forming phosphorus compound is reacted with 3 moles of a hydroxyl-terminated polyester, there is obtained a phosphoric ester compound in which all of the three R's in the above formula are a hydroxyl-terminated polyester residues. Also, when 1 mole of an ester-forming phosphorus compound is reacted with 2 moles or 1 mole of hydroxyl-terminated polyester, there is obtained a phosphoric ester compound in which one or two of the three R's in the above formula are hydroxyl-terminated polyester residues.

Among the ester-forming phosphorus compounds that can be used in this invention are phosphorus oxychloride, phosphorus pentoxide, phosphorus trichloride, phosphoric anhydride, and acetyl phosphate. Preferable among them is phosphorus oxychloride.

The reaction of the above-mentioned ester-forming phosphrous compound with a hydroxyl-terminated polyester should preferably be carried out in an organic solvent which is both inert to the reactants and reaction products and solubilizes them. Examples of such organic solvents include aliphatic saturated hydrocarbons such as octane, petroleum ether, ligroin, mineral spirit, and kerosene; aromatic hydro-carbons such as benzene, toluene, and xylene; halogenated aliphatic hydrocarbons such as trichloroethane and tetrachloroethane; and chlorinated aromatic hydrocarbons such as dichlorobenzene and trichloro-benzene. They have been used for the production of polyesters.

In the case where a halogenated phosphorus compound such as phosphorus oxychloride is used as the ester-forming phosphorus compound, it is desirable to use as a catalyst a tertiary amine such as triethylamine; an organic base such as pyridine, 2, 6-lutidine, and 1,8-diaza-bicyclo-(5.4 0)undecene-7; or an inorganic base such as oxides, hydroxides, carbonates and organic acid salts of alkali metals or alkaline earth metals.

In the case where one or two of the three R's in the above formula are hydrogen atoms or cations (mentioned later), a cation source mentioned later should be added to the reaction mixture to form a salt when the reaction of an ester-forming phosphorus compound with 1 mole or 2 moles of hydroxyl-terminated polyester is substantially complete, or after the hydrolysis is performed as required (in the case where a halogenated phosphorus compound is used as an ester-forming phosphorus compound). The cation source may be added before, during, or after the production of the pigment composition of this invention using the phosphoric ester compound of the above-mentioned formula, which has one or two hydroxyl-terminated polyester residues, with the remaining R's being hydrogen ions.

The molecular weight of the hydroxyl-terminated polyester used in the above-mentioned reaction is not critical. A dimer or a polymer having an average molecular weight lower than 10,000, preferably about 500 to 5,000, can be used.

The hydroxyl-terminated polyester as mentioned above is obtained by self-polycondensation of a hydroxy-carboxylic acid which has both a hydroxyl group and a carboxyl group on the molecule. The preferred hydroxy-carboxylic acids is one which has 4 to 30 carbon atoms. Examples of such hydroxy-carboxylic acid include ricinoleic acid, 12-hydroxy-stearic acid, castor oil fatty acid, hydrogenated castor oil fatty acid δ-hydroxy-valeric acid, ε-hydroxy-caproic acid, p-hydroxyethyloxybenzoic acid, and 2-hydroxynaphthalene-6-carboxylic acid. They may be used individually or in combination with one another.

It is also possible to use, in the same manner a hydroxyl-terminated polyester obtained by esterifying an alcohol with the terminal carboxyl group of a polyester obtained from the above-mentioned hydroxy-carboxylic acid. Examples of the alcohol used for the terminal esterification are alcohols having 1 to 30 carbon atoms, such as methyl alcohol, ethyl alcohol, propyl alcohol, butyl alcohol, hexyl alcohol, octyl alcohol, decyl alcohol, dodecyl alcohol, tridecyl alcohol, hexadecyl alcohol, octadecyl alcohol, tetracosyl alcohol, hexacosyl alcohol, octadecenyl alcohol, cyclohexyl alcohol, and benzyl, alcohol.

The phosphoric ester compound used as a dispersant in this invention is obtained by reacting 3 moles, 2 moles, or 1 mole of the above-mentioned hydroxyl-terminated polyester with 1 mole of the above-mentioned ester-forming phosphorus compound. Where 2 moles or 1 more of the above-mentioned polyester is reacted with 1 mole of the phosphorus compound, one or two R's other than polyester residues in the above-mentioned formula may be groups other than the above-mentioned polyester, such as residues of alcohol compounds, hydrogen atoms, inorganic cations, or organic cations. Examples of the alcohol residues are the residues of the above-mentioned ordinary alcohols, the hydroxy-carboxylic acid above-mentioned as the monomer and hydroxyl ester of the above-mentioned alcohol and the above-mentioned hydroxyl-carboxylic acid.

Examples of inorganic cations include alkaline metals such as sodium and potassium; polyvalent metals such as magnesium, calcium, strontium, barium, manganese, iron, cobalt, nickel, zinc, aluminum, and tin; and ammonium. Examples of organic cations include cations of primary, secondary, and tertiary monoamines and polyamines having 1 to 30 carbon atoms such as methylamine, ethylamine, propylamine, butylamine, hexylamine, octylamine, dodecylamine, octadecylamine, oleylamine, diethylamine, dibutylamine, distearylamine, triethylamine, tributylamine, dimethyloctylamine, dimethyldecylamine, dimethyldodecylamine, dimethyltetradecylamine, dimethylhexadecylamine, dimethyloctadecylamine, dimethyloleylamine, dilaurylmonomethylamine, trioctylamine, dimethylaniline, ethylenediamine, propylene diamine, hexamethylenediamine, and stearylpropylenediamine; quaternary ammoniums such as octadecyl trimethylammonium and dioctadecyl dimethylammonium; and alkanolamines such as ethanolamine, diethanolamine, triethanolamine, dimethylethanolamine, diethylethanolamine, propanolamine, and other alkanolamines obtained by adding ethylene oxide to the above-mentioned higher aliphatic amine. These amines can be used individually or in combination with one another. Where a higher aliphatic amine or ammonium derived from natural oils and fats is used as a raw material, it is possible to use a mixture of amines each differing in carbon number and degree of saturation as such.

The above-mentioned phosphoric ester compound used in this invention comes in different forms according to the substituent group R. The ones defined below are comparatively hydrophobic dispersants adequately soluble in an organic solvent. (1) All of the three R's are residues of hydroxyl-terminated polyester. (2) The three R's are residues of hydroxyl-terminated polyester and residues of other alcohols. (3) One of two of the three R's are cations of a higher amine.

On the other hand, the compound of the above-formula in which one or two of the three R's are cations selected from the alkali metals, ammonium, lower amines, and lower alkanolamines is a comparatively hydrophilic dispersant soluble or dispersible in water or aqueous solutions.

The pigment used in this invention may be any known organic pigment, inorganic pigment, or extender pigment. Examples of organic pigments include phthalocyanine pigments, azo-pigments, condensed azo-pigments, anthraquinone pigments, perinone pigments, perylene pigments, indigo pigments, thioindigo pigment, isindolinone pigment, azomethinazo pigments, dioxadine pigments, quinacridone pigments, aniline black pigments, triphenylmethane pigments, and carbon black. Examples of inorganic pigments include titanium oxide pigments, iron oxide pigments, iron hydroxide pigments, chromium oxide pigments, spinel type calcined pigment, lead chromate pigments, vermilion pigments, Prussian Blue, aluminum powder, and bronze powder. Examples of extender pigments include calcium carbonate, barium sulfate, silicon dioxide, and aluminum hydroxide. These pigments are used in the form of dry fine powder, aqueous filter cake, or aqueous suspension.

The pigment composition of this invention is prepared by compounding 100 parts by weight of the above-mentioned pigment and 1 to 300 parts by weight, preferably 3 to 150 parts by weight, of the above-mentioned phosphoric ester compound. Needless to say, these two components are incorporated with a known proper organic solvent, aqueous or oily paint vehicle, aqueous or oily printing ink varnish, aqueous or oily coating vehicle, thermoplastic resin, thermosetting resin, plasticizer, crosslinking agent, and catalyst. The resulting composition can be used as such as a paint or printing ink. These essential components and optional components can be mixed and dispersed by any known method using a ball mill, sand mill, attritor, continuous horizontal medium dispersing machine, two-roll mill, three-roll mill, pressure kneader, Banbury mixer, or extruder.

In the case where a pigment in the form of an aqueous filter cake or aqueous suspension is used, the pigment composition of this invention can be prepared by the flushing method. According to this method, the pigment is transferred from the aqueous phase to the organic solvent phase by mixing the pigment with the comparatively hydrophobic dispersant among the dispersant used in this invention, alone or, preferably, in the form of a solution in a hydrophobic organic solvent (which may contain a binder for ink or paint).

The pigment composition of this invention may be embodied in the following two forms. (1) A composition containing pigments in high concentrations, which is useful as a coloring agent for printing inks, paints, coating agents, and synthetic resins. In this embodiment, the concentration of pigment is 20 to 95 wt % and the concentration of the dispersant is 1 to 300 wt % pigment weight. (2) A composition useful as a paint which contains a solvent, binder resin, etc. required for paints, printing inks, and coating agents. In this embodiment, the concentration of pigment is 0.1 to 20 wt % and the concentration of the dispersant is 1 to 300wt % for pigment weight.

The paint mentioned above embraces all the known paints containing pigments. Examples include automobile paints, building paints, wood paints, vehicle and machine paints, household paints, plastics paints, precoat metal paints, can paints, ship paints, anticorrosion paints, photocurable paints, electron ray curable paints electrostatic coating power paints, and vinylsol paints.

The printing ink mentioned above embraces all the known printing inks. Examples include letterpress ink, lithographic ink, rotogravure ink, screen ink, newspaper ink, and flexographic ink.

The pigment composition of this invention may be in the form of solid or liquid. In the latter case, the medium is water, a mixture of water and hydrophilic organic solvent, or an organic solvent. Examples of organic solvents include aliphatic, alicyclic, and aromatic hydro-carbons; halogenated hydrocarbons, esters, ketones, glycol ethers, and alcohols. They are not limitative.

The paint vehicle, printing ink varnish, and coating agent vehicle may be any known oily or aqueous binders which are selected according to uses. Examples of the binder include long-oil alkyd resin, medium-oil alkyd resin, short-oil alkyd resin, phenol-modified alkyd resin, styrenated alkyd resin, aminoalkyd resin, oil-free alkyd resin, thermosetting acrylic resin, acryl lacquer resin, acrylpolyol resin, polyester resin, epoxy resin, butylated melamine resin, methylated melamine resin, ureamelamine resin, phenolic resin, rosin-modified phenolic resin, rosin-modified maleic acid resin, phenol-modified maleic acid resin, polyurethane resin, styrene resin, styrene-acrylic resin, styrene-diene copolymer, vinyl chloride copolymer, vinyl-acetate resin, vinyl acetate copolymer, ethylene-vinyl acetate resin, butyral resin, petroleum resin, rosin ester, maleinized rosin ester, drying oil, and boiled oil.

Examples of thermoplastic resins include polyvinyl chloride resin, polystyrene resin, acrylonitrile-styrene resin, acrylic resin, methacrylic-styrene resin, and polyester resin.

Examples of plasticizers include phthalic esters, adipic ester, sebacic esters, polyester plasticizer, and epoxidized soybean oil.

If necessary, the pigment composition of this invention may be used in combination with a known pigment dispersant or flushing agent such as higher aliphatic monoamine, higher aliphatic diamine, and acetate thereof and higher fatty acid salt thereof.

The phosphoric ester compound containing a polyester chain which is used in the present invention is not in danger of deterioration and putrefaction due to oxidation and rancidity, unlike lecithin as a natural phospholipid, which has been conventionally used as a pigment dispersant for paints, printing inks, and plastics colorants. It has good stability and produces an outstanding effect in the surface modification of pigments and the dispersion of pigments in a medium.

The phosphoric ester compound of this invention is readily adsorbed on the pigment surface due to the electronic attraction produced by the phosphoric ester linkage and the ester linkage contained therein and the affinity for mediums produced by the hydrocarbon chain contained therein. This adsorption improves the wettability, dispersibility, and flowability of pigments. In addition, the phosphoric ester compound is useful as a flushing agent for the aqueous filter cake of pigment. It makes the pigment surface lipophilic or hydrophobic, permitting effective flushing of pigments.

The invention is now described in more detail with reference to Referential Examples (production of the phosphoric ester compound) and Working Examples. (In examples, quantities are expressed as parts by weight or percent by weight.)

RENTIAL EXAMPLE 1

(1) Synthesis of hydroxyl-terminated polyester from 12-hydroxy-stearic acid and methylesterification thereof.

Into a four-mouth glass reactor equipped with a stirrer, thermometer, reflux condenser with a moisture distilling tube, and inlet and placed in an oil bath were charged 100 parts of 12-hydroxystearic acid and 100 parts of toluene, followed by stirring for dissolution. After heating, there was added 1.0 part of p-toluenesulfonic acid as a polycondensation catalyst. The reaction liquid was heated to 120° C. to promote the polycondensation of 12-hydroxystearic acid. The progress of the reaction was measured by means of the volume of distilled water and the infrared absorption spectrum of the reaction product after the lapse of 60 minutes, 120 minutes, and 180 minutes. After 200 minutes, the polycondensation reaction was terminated by cooling.

When the reactants were cooled to 63° C., there were added 50 parts of methanol, 100 parts of methyl acetate, and 0.5 parts of p-toluene-sulfonic acid. The reactants were heated to 110° C., with distillation of the solvent, to perform the methylesterification of the terminal carboxyl group of the polyester. When 150 parts of solvent had been distilled away, the reactants were cooled to 63° C. Then 200 parts of methanol were added and the solvent was distilled away by heating to 110° C. The total amount distilled away was 245 parts.

The methylesterification took about 5 hours. After the reaction, 300 parts of water were added to the reaction mixture to extract water-soluble components from the reaction mixture. The oil layer was collected from the separating two layers. For dehydration of the oil phase, 150 parts of toluene and 200 parts of methanol were added, followed by heating to 130° C. with blowing of nitrogen gas. Thus, water and solvents, 345 parts in total, were distilled away.

The reaction product thus obtained was an amber liquid. It was identified a methyl ester of as a self-polycondensation polyester of 12-hydroxystearic acid by the infrared absorption spectrum and gel permeation chromatograph.

It was confirmed by the acid value of the reaction product that the methylesterifiaction of the terminal carboxyl group of the polyester was almost complete. The hydroxyl value of the reaction product was 40.8. This indicates that 1 gram equivalent of the methyl ester of the self-polycondensation polyester of 12-hydroxystearic acid is 1,375 and the average degree of polycondensation is about 5.

(2) Synthesis of phosphoric triester

Into a four-mouth glass reactor equipped with a stirrer, thermometer, dropping funnel, and reflux condenser and placed in a water bath were charged 188.2 parts of the methyl ester of the polyester obtained in the above-mentioned step (1) (1 gram equivalent was 1,375), 188.2 parts of benzene, and 16.6 parts of triethylamine, followed by stirring and dissolution. The dropping funnel was filled with 7.0 parts of phosphorus oxychloride.

The equivalent ratio of the hydroxyl-terminated polyester, phosphorus oxychloride, and triethylamine was 3:3:3.6.

While stirring and cooling the reaction mixture (below 10° C.), phosphorus oxychloride was added dropwise from the dropping funnel over 30 minutes. After addition, the reaction was continued for 2 hours with stirring, followed by cooling.

For the removal of triethylamine (as a dehydrochlorination catalyst) and triethylamine hydrochloride, the reaction mixture was washed with an equal amount of deionized water, half an amount of water acidified with hydrochloric acid, and three times with half an amount of deionized water using a separatory funnel. The washed benzene layer was dried with sodium sulfate and benzene was distilled away under vacuum. Thus there was obtained a brown liquid reaction product.

The reaction product was identified as a phosphoric triester compound of the methyl ester of the self-polycondensation polyester of 12-hydroxy-stearic acid by the infrared absorption spectrum and gel permeation chromatograph. The average molecular weight of the principal component of this compound was 4,200. (Dispersant 1 )

REFERENTIAL EXAMPLES 2 TO 12

Various phosphoric triester compounds were prepared in the same manner as step (2) in Referential Example 1, except that the reactants were replaced by those which are shown in Table 1 below.

TABLE 1

| No. | Reactants | Ave. M.W. | (I)* | (II)** |
|---|---|---|---|---|
| 2 | (Dispersant 2) | | | |
| | Methyl ester of poly-12-hydroxy-stearic acid | 880 | 3 | 2600 |
| | Phosphorus oxychloride | | 3 | |
| 3 | (Dispersant 3) | | | |
| | Methyl ester of polyricinolic acid | 1430 | 3 | 4300 |
| | Phosphorus oxychloride | | 3 | |
| 4 | (Dispersant 4) | | | |
| | Butyl ester of poly-12-hydroxy-stearic acid | 920 | 3 | 2800 |
| | Phosphorus oxychloride | | 3 | |
| 5 | (Dispersant 5) | | | |
| | Butyl ester of polyricinolic acid | 1470 | 3 | 4500 |
| | Phosphorus oxychloride | | 3 | |
| 6 | (Dispersant 6) | | | |
| | Dodecyl ester of poly-12-hydroxy-stearic acid | 1310 | 3 | 4000 |
| | Phosphorus oxychloride | | 3 | |
| 7 | (Dispersant 7) | | | |
| | Oleyl ester of polyricinolic acid | 1110 | 3 | 3400 |
| | Phosphorus oxychloride | | 3 | |
| 8 | (Dispersant 8) | | | |
| | Tridecyl ester of poly-12-hydroxy-stearic acid | 1050 | 3 | 3200 |
| | Phosphorus oxychloride | | 3 | |
| 9 | (Dispersant 9) | | | |
| | Oleyl ester of poly-ε-caproic acid | 960 | 3 | 2900 |
| | Phosphorus oxychloride | | 3 | |
| 10 | (Dispersant 10) | | | |
| | Monoalcohol of polyester of azelaic acid, hexamethylene glycol, and lauric acid (3:4:1 molar ratio) | 1100 | 3 | 3300 |
| | Phosphorus oxychloride | | 3 | |
| 11 | (Dispersant 11) | | | |
| | Poly-12-hydroxystearic acid | 860 | 3 | 2600 |
| 12 | (Dispersant 12) | | | |
| | Phosphorus oxychloride | | 3 | |
| | Polyricinolic acid | 860 | 3 | 2600 |
| | Phosphorus oxychloride | | 3 | |

*Amount of the reactants (in equivalents)
**Average molecular weight of the principal component of the resulting phosphoric triester.

REFERENTIAL EXAMPLE 13

Into a four-mouth glass reactor (the same one as used in step (2) in Referential Example) equipped with a stirrer, thermometer, dropping funnel, and reflux condenser were charged 23.6 parts of phosphorus oxychloride. 147.7 parts of methyl ester of poly-12-hydroxystearic acid having an average molecular weight of 1440 (separately prepared in the same manner as in step (1) in Referential Example 1), which had been mixed with and dissolved in 147.7 parts of benzene and 12.5 parts of triethylamine, was slowly added dropwise at 5° 10° C. over 2 hours. The reaction was carried out at 10° C. for 1 hour. Further, 30.8 parts of the methyl ester of the poly-12-hydroxystearic acid having an average molecular weight of 600 (prepared in the same manner as above), which had been mixed with and dissolved in 30.8 parts of benzene and 6.2 parts of triethylamine, were slowly added dropwise at 10° to 20° C., over 1 hour. The reaction was carried out for 1 hour each at 20° C., 40° C., and 60° C. and for 2 hours at 80° C. with stirring. Finally, the reaction product was cooled.

The molar ratio of polyester (average molecular weight 1440), polyester (average molecular weight 600), phosphorous oxychloride, and triethylamine was 2:1:3:3.6.

The cooled reaction product was washed, purified, dried, concentrated, and desolvated in the same manner as in step (2) of Referential Example 1. Thus there was obtained a brown liquid.

The reaction product was identified as a phosphoric triester of the methyl ester of the poly-12-hydroxystearic acid in the same way as in step (2) of Referential Example 1. The average molecular weight of the principal component of this compund was about 3,500. (Dispersant 13)

REFERENTIAL EXAMPLE 14 TO 19

Various phosphoric triester compounds were prepared in the same manner as in Referential Example 13, except that the reactants were replaced by those which are shown in Table 2 below.

TABLE 2

| No. | Reactants | Ave. M.W. | (I)* | (II)** |
|---|---|---|---|---|
| 14 | (Dispersant 14) | | | |
| | Methyl ester of poly-12-hydroxy-stearic acid | 1440 | 2 | |
| | Methyl ester of polyricinolic acid | 590 | 1 | 3500 |
| | Phosphorus oxychloride | | 3 | |
| 15 | (Dispersant 15) | | | |
| | Methyl ester of polyricinolic acid | 1430 | 2 | |
| | Methyl ester of polyricinolic acid | 590 | 1 | 3500 |
| | Phosphorus oxychloride | | 3 | |
| 16 | (Dispersant 16) | | | |
| | Methyl ester of poly-12-hydroxy-stearic acid | 2010 | 2 | |
| | Butyl ester of 12-hydroxystearic | | 1 | 4400 |

TABLE 2-continued

| No. | Reactants | Ave. M.W. | (I)* | (II)** |
|---|---|---|---|---|
| | acid | | | |
| | Phosphorus oxychloride | | 3 | |
| 17 | (Dispersant 17) | | | |
| | Methyl ester of polyricinolic acid | 2830 | 1 | |
| | Mixture of dodecyl ester and tridecyl esters of ricinolic acid | | 2 | 3900 |
| | Phosophorus oxychloride | | 3 | |
| 18 | (Dispersant 18) | | | |
| | Methyl ester of poly-12-hydroxy-stearic acid | 2010 | 2 | |
| | Dodecyl alcohol | | 1 | 4200 |
| | Phosphorus oxychloride | | 3 | |
| 19 | (Dispersant 19) | | | |
| | Methyl ester of polyricinolic acid | 2830 | 1 | |
| | Oleyl alcohol | | 2 | 3400 |
| | Phosphorus oxychloride | | 3 | |

*Amount of the reactants (in equivalents)
**Average molecular weight of the principal component of the resulting phosphoric triester.

REFERENTIAL EXAMPLE 20

Synthesis of a phosphoric diester compound:

A four-mouth glass reactor equipped with a stirrer, thermometer, dropping funnel, and reflux condenser and a water bath were provided. The reflux condenser was connected to a safety bottle and a hydrogen chloride gas absorbing bottle which was further connected to a vaccum pump and mercury manometer.

In the reactor was charged 7.0 parts of phosphorus oxychloride. The dropping funnel was filled with 62.8 parts of the methyl ester of the polyester (1 gram equivalent=1,375) obtained in step (1) in Referential Example (1) and 62.8 parts of benzene as a solvent.

With the reactor cooled with iced water, the benzene solution was added dropwise at 5° to 10° C. The reactants were stirred at 10° C. for 1 hour. The reactor was gradually evacuated while increasing the reaction temperature. Hydrogen chloride gas formed by the reaction was absorbed by an aqueous solution of sodium hydroxide filled in the absorbing bottle. The reaction temperature was gradually raised to 40° C. and the reaction system was gradually evacuated to 100 mmHg over 5 hours. When the evolution of hydrogen chloride gas was not noticed any longer, the reaction system was cooled. In this state, the reaction system contains phosphoric (methyl ester of poly-12-hydroxystearic acid) monoester dichloride. The dropping funnel was filled with 62.8 parts of the above-mentioned methyl ester of the polyester, 62.8 parts of benzene, and 4.62 parts of triethylamine, followed by mixing and dissolution. The resulting solution at 10° to 20° C. was added dropwise to the reactor over 60 minutes, followed by stirring for 2 hours. The reaction temperature was raised to 40° C. over 2 hours, and stirring was continued for 2 hours. The reactor was cooled.

The equivalent ratio of the hydroxyl-terminated polyester, phosphorus oxychloride, and triethylamine was 2:3:1.

The reaction liquid was washed with water, a dilute aqueous solution of sodium hydroxide, a dilute aqueous solution of hydrochloric acid, and water, for the dechlorination (hydrolysis) of the phosphoric ester chloride and removal of chloride and the removal of triethylamine hydrochloride. The washed benzene layer was dried with sodium sulfate, and benzene was distilled away under reduced pressure. Thus there was obtained a brown liquid reaction product.

It was confirmed by infrared absorption spectrum and gel permeation chromatograph that the reaction product is composed mainly of a phosphoric diester compound of the methyl ester of the self-polycondensation polyester of 12-hydroxystearic acid. (Dispersant 20)

The average molecular weight of the principal component was 2,500 to 2,800.

REFERENTIAL EXAMPLE 21 TO 30

Various phosphoric diester compounds were prepared in the same manner as in Referential Example 20, except that the reactants were replaced by those which are shown in Table 3 below.

TABLE 3

| No. | Reactants | Ave. M.W. | (I)* | (II)** |
|---|---|---|---|---|
| 21 | (Dispersant 21) | | | |
| | Methyl ester of poly-12-hydroxy-stearic acid | 800 | 2 | 1600 to 1800 |
| | Phosphorus oxychloride | | 3 | |
| 22 | (Dispersant 22) | | | |
| | Methyl ester of polyricinolic acid | 1430 | 2 | 2600 to 2900 |
| | Phosphorus oxychloride | | 3 | |
| 23 | (Dispersant 23) | | | |
| | Butyl ester of poly-12-hydroxy-stearic acid | 920 | 2 | 1700 to 1900 |
| | Phosphorus oxychloride | | 3 | |
| 24 | (Dispersant 24) | | | |
| | Butyl ester of polyricinolic acid | 1470 | 2 | 2700 to 3000 |
| | Phosphorus oxychloride | | 3 | |
| 25 | (Dispersant 25) | | | |
| | Dodecyl ester of poly-12-hydroxy-stearic acid | 1050 | 2 | 1900 to 2100 |
| | Phosphorus oxychloride | | 3 | |
| 26 | (Dispersant 26) | | | |
| | Oleyl ester of polyricinolic acid | 1110 | 2 | 2200 to 2200 |
| | Phosphorus oxychloride | | 3 | |
| 27 | (Dispersant 27) | | | |
| | Benzyl ester of poly-12-hydroxy-stearic acid | 1236 | 2 | 2200 to 2500 |
| | Phosphorus oxychloride | | 3 | |
| 28 | (Dispersant 28) | | | |
| | Oleyl ester of poly-ε-caproic acid | 950 | 2 | 1800 to 2000 |
| | Phosphorus oxychloride | | 3 | |
| 29 | (Dispersant 29) | | | |
| | Poly-12-hydroxystearic acid | 860 | 2 | 1600 to 1800 |
| | Phosphorus oxychloride | | 3 | |
| 30 | (Dispersant 30) | | | |
| | Polyricinolic acid | 860 | 2 | 1600 to 1800 |
| | Phosphorus oxychloride | | 3 | |

*Amount of the reactants (in equivalents)
**Average molecular weight of the principal component of the resulting phosphoric diester.

REFERENTIAL EXAMPLE 31

Into the same four-mouth glass reactor as used in Referential Example 21, which was equipped with a stirrer, thermometer, dropping funnel, evacuating system, and hydrogen chloride gas absorber, was charged 7.0 parts of phosphorus oxychloride.

The dropping funnel was filled with 65.8 parts of the methyl ester of poly-12-hydroxystearic acid (average molecular weight=1,440) prepared in the same manner as in step (1) of Referential Example 1, and 65.8 parts of benzene as a solvent. The reaction was carried out in the same manner as in Referential Example 21 to give phosphoric (methyl ester of poly-12-hydroxystearic acid) monoester dichloride. Then, 27.4 parts of the methyl ester of poly-12-hydroxystearic acid (average molecular weight=600) prepared in the same manner as in step (1) of Referential Example 1 was mixed with and dissolved in 27.4 parts of benzene and 4.62 parts of triethylamine. The reaction was carried out in the same manner of in Referential Example 21.

The equivalent ratio of the polyester (average molecular weight=1,440, the polyester (average molecular weight=600), phosphorous oxychloride, and triethylamine was 1:1:3:1.

After cooling, the reaction liquid underwent dechlorination (hydrolysis), washing, purification, drying, concentration, and desolvation in the same manner as in Referential Example 21. Thus there was obtained a brown liquid reaction product.

It was confirmed by infrared absorption spectrum and gel permeation chromatograph that the reaction product is composed mainly of a phosphoric diester of the methyl ester of poly-12-hydroxystearic acid. (Dispersant 31)

The average molecular weight of the principal component was about 1,900 to 2,100.

REFERENTIAL EXAMPLES 32 TO 39

Various phosphoric diester and monoester compounds were pripared in the same manner as in Referential Example 31, except that the reactants were replaced by those which are shown in Table 4 below.

TABLE 4

| No. | Reactants | Ave. M.W. | (I)* | (II)** |
|---|---|---|---|---|
| 32 | (Dispersant 32) | | | |
| | Methyl ester of poly-12-hydroxy-stearic acid | 1440 | 1 | |
| | Methyl ester of polyricinolic acid | 590 | 1 | 1900 to 2100 |
| | Phosphorus oxychloride | | 3 | |
| 33 | (Dispersant 33) | | | |
| | Methyl ester of polyricinolic acid | 1430 | 1 | |
| | Methyl ester of polyricinolic acid | 590 | 1 | 1900 to 2100 |
| | Phosphorus oxychloride | | 3 | |
| 34 | (Dispersant 34) | | | |
| | Methyl ester of poly-12-hydroxy-stearic acid | 2010 | 1 | 1600 to 1800 |
| | Butyl ester of 12-hydroxystearic acid | | 1 | |
| | Phosphorus oxychloride | | 3 | |
| 35 | (Dispersant 35) | | | |
| | Methyl ester of polyricinolic acid | 1430 | 1 | |
| | Butyl ester of ricinolic acid | | 1 | 1600 to 1800 |
| | Phosphorus oxychloride | | 3 | |
| 36 | (Dispersant 36) | | | |
| | Methyl ester of poly-12-hydroxy-stearic acid | 1375 | 1 | |
| | Dodecyl alcohol | | 1 | 1400 to 1600 |
| | Phosphorus oxychloride | | 3 | |
| 37 | (Dispersant 37) | | | |
| | Methyl ester of polyricinolic acid | 1430 | 1 | |
| | Oleyl alcohol | | 1 | 1500 to 1700 |
| | Phosphorus oxychloride | | 3 | |
| 38 | (Dispersant 38) | | | |
| | Methyl ester of poly-12-hydroxy-stearic acid | 1375 | 1 | 1400 to 1500 |
| | Phosphorus oxychloride | | 3 | |
| 39 | (Dispersant 39) | | | |
| | Methyl ester of polyricinolic acid | 1430 | 1 | 1400 to 1500 |
| | Phosphorus oxychloride | | 3 | |

*Amount of the reactants (in equivalents)
**Average molecular weight of the principal component of the resulting phosphoric diester of monoester.

EXAMPLE 1

Into a flusher were charged 238 parts of an aqueous filter cake (pigment content=42%) of copper phthalocyanine blue pigment (C. I. pigment Blue 15-3). To the flusher were further added 20 parts of Dispersant 1 (obtained in Referential Example 1) dissolved in 58.5 parts of a petroleum ink solvent. Flushing was carried out by mixing in the usual way. As compared with the conventional flushing agent, the dispersant in this example more readily freed water from the cake and transferred the copper phthalocyanine blue pigment to the oily dispersant phase.

After complete removal of water, there was obtained a flushed color containing copper phthalocyanine blue pigment. This flushed color was made into an offset litho ink according to the following formulation.

| | |
|---|---|
| Flushed color (pigment = 56%) | 34.8 parts |
| Litho varnish | 63.0 parts |
| 5% cobalt drier | 0.2 parts |
| 8% manganese drier | 1.0 parts |
| Ink solvent | 1.0 parts |
| Total | 100.0 parts |

The litho varnish is formulated as follows:

| | |
|---|---|
| Rosin-modified phenolic resin | 35.0 parts |
| Drying oil | 25.0 parts |
| Drying oil-modified isophthalic acid alkyd | 10.0 parts |
| Ink solvent | 29.5 parts |
| Aluminum chelator | 0.5 parts |
| Total | 100.0 parts |

The ink thus prepared was used offset printing on uncoated printing paper. There was obtained a printed matter of bright cyan color.

A flushed color was prepared in the same manner as above from an aqueous filter cake (pigment content=27%) of disazo yellow pigment (C.I. pigment yellow 12) and an aqueous filter cake (pigment content=25%) of brilliant carmine 6B pigment (C.I pigment red 57-1). The flushed color was made into a yellow and a magenta offset litho ink.

A flushed color was prepared in the same manner as above from an aqueous filter cake of lake red C pigment (C.I. pigment red 53-1), and the flushed color made into a bronze red offset litho ink. A flushed color was also prepared from aqueous filter cake of copper phthalocyanine green pigment (C.I. pigment green 7), and the flushed color was made into a green offset litho ink.

The dispersant readily freed water in the flushing operation and readily transferred the pigment to the oil phase. In addition, the flushed color was easily made into inks and the resulting inks gave a printed matter of bright color in offset litho printing.

When tested as mentioned above, Dispersants 2 to 19 also produced the same effect as Dispersant 1.

EXAMPLE 2

Using Dispersant 1 obtained in Referential Example 1, carbon black was mixed with and dispersed into varnish on a three-roll mill according to the following formulation.

| Carbon black pigment | 20 parts |
|---|---|
| Dispersant 1 | 6 parts |
| Offset litho ink varnish | 69 parts |
| Total | 95 parts |

The resulting carbon black dispersion was made into a carbon black ink by uniform mixing according to the following formulation.

| Carbon black dispersion | 95.0 parts |
|---|---|
| 5% cobalt drier | 0.2 parts |
| 8% manganese drier | 1.0 parts |
| Ink solvent | 3.8 parts |
| Total | 100.0 parts |

The ink thus prepared was used for offset printing to give a printed matter of high balckness. When tested as mentioned above, Dispersants 2 to 19 also produced the same effect as Dispersant 1.

The yellow ink, red ink, blue ink, and black ink prepared in this example were used as a four-color process ink for offset litho printing to give a bright beautiful multicolor printed matter.

EXAMPLE 3

A blue quick drying enamel (air drying type) for metallic materials (e.g., machines and vehicles) was produced according to the following formulation.

| Flushed color (pigment = 56%) of copper phthalocyanine blue obtained in Example 1 | 9.6 parts |
|---|---|
| Rutile titanium white | 2.0 parts |
| Fast drying styrenized alkyd resin | 72.6 parts |
| Xylene | 6.6 parts |
| Mineral spirit | 8.8 parts |
| 6% cobalt naphthenate | 0.3 parts |
| Antiskinning agent | 0.1 parts |
| Total | 100.0 parts |

The resulting enamel provided bright beautiful coatings.

Flushed colors were prepared in the same manner as in Example 1 from an aqueous filter cake of disazo yellow pigment (C.I. pigment yellow 14), fast yellow pigment (formed by coupling acetoacetanilide by diazotizing 4-aminophthalimide), watchung red pigment (C. I. pigment red 48), and carmine FB pigment (C. I. pigment rod 3). The flushed colors were made into paints of varied colors according to the above-mentioned formulation. The paints gave bright beautiful coated plates.

EXAMPLE 4

A dispersion of copper phthalocyanine blue (C.I. pigment blue 15-3) in a xylene-butanol mixed solvent was prepared by dispersing the pigment using a continuous horizontal medium dispersing machine according to the following formulation.

| Copper phthalocyanine blue pigment (dried and pulverized) | 10 parts |
|---|---|
| Dispersant 1 obtained in Referential Example 1 | 2 parts |
| Xylene | 13 parts |
| Butanol | 5 parts |
| Total | 30 parts |

The resulting dispersion was made into an acrylic lacquer enamel for automobiles according to the following formulation.

| Solvent dispersion | 3.0 parts |
|---|---|
| Rutile titanium white | 14.0 parts |
| Thermoplastic acrylic resin | 70.0 parts |
| Toluene | 6.8 parts |
| Xylene | 3.2 parts |
| Butanol | 2.2 parts |
| Cellosolve | 0.8 parts |
| Total | 100.0 parts |

The resulting enamel provided bright beautiful coatings.

When tested as mentioned above, Dispersants 2 to 19 also produced the same effect as Dispersant 1.

EXAMPLE 5

Into a flusher were charged 238 parts of an aqueous filter cake (pigment content=42%) of copper phthalocyanine blue pigment (C.I. pigment blue 15-3) and 60 parts of the amine salt of Dispersant 20 dissolved in 40 parts of a petroleum ink solvent. (The amine salt was prepared by neutralizing the phosphoric acid radical of Dispersant 20 with about one equivalent of rosin amine.) Flushing was performed in the usual way. As compared with known flushing agents, the amine salt of Dispersant 20 more readily freed water from the filter cake and more readily transferred the copper phthalocyanine blue pigment to the oily dispersant phase.

After the complete removal of water, there was obtained a flushed color containing copper phthalocyanine blue pigment. The resulting flushed color was made into an offset litho printing ink according to the following formulation.

| Flushed color (pigment content = 50%) | 38.0 parts |
|---|---|
| Offset litho ink varnish | 60.0 parts |
| 5% cobalt drier | 0.2 parts |
| 8% manganese drier | 1.0 parts |
| Ink solvent | 0.8 parts |
| Total | 100.0 parts |

The litho varnish was formulated as follows:

| Rosin-modified phenolic resin | 35.0 parts |
|---|---|
| Drying oil | 25.0 parts |
| Drying oil-modified isophthalic acid alkyd | 10.0 parts |
| Ink solvent | 29.5 parts |
| Aluminum chelator | 0.5 parts |
| Total | 100.0 parts |

The ink thus prepared was used for offset printing on uncoated printing paper. There was obtained a printed matter of bright cyan color.

A flushed color was prepared in the same manner as above from an aqueous filter cake (pigment content=27%) of disazo yellow pigment (C.I. pigment yellow 12) and an aqueous filter cake (pigment content=25%) of brilliant carmine 6B pigment (C.I. pigment red 57-1). The flushed color was made into a yellow and a magenta offset litho ink.

A flushed color was prepared in the same manner as above rom an aqueous filter cake of lake red C pigment (C.I. pigment red 53-1), and the flushed color was made into a bronze red offset litho ink. A flushed color was also prepared from an aqueous filter cake of copper phthalocyanine green pigment (C.I. pigment green 7), and the flushed color was made into a green offset litho ink.

The dispersant readily freed watrer in the flushing operation and readily transferred the pigment to the oil phase. In addition, the flushed color was easily made into inks and the resulting inka gave a printed matter of bright in offset litho printing.

When tested as mentioned above, Dispersants 21 to 39 also produced the same effect as Dispersant 20.

The same superior effect as mentioned above was produced when the dispersant was neutralized with coconut amine, beef tallow propylene diamine, or hydroxides of calcium, strontium, or aluminum, in place of rosin amine.

EXAMPLE 6

Using Dispersant 20 obtained in Referential Example 20, carbon black was mixed with and dispersed into varnish on a three-roll mill according to the following formulation.

| | |
|---|---|
| Carbon black pigment | 20 parts |
| Beef tallow propylene diamine salt of Dispersant 20 | 6 parts |
| Offset litho ink varnish | 69 parts |
| Total | 95 parts |

The resulting carbon black dispersion was made into a carbon black ink by uniform mixing according to the following formulation.

| | |
|---|---|
| Carbon black dispersion | 95.0 parts |
| 5% cobalt drier | 0.2 parts |
| 8% manganese drier | 1.0 parts |
| Ink solvent | 3.8 parts |
| Total | 100.0 parts |

The ink thus prepared was used for offset printing to give a printed matter of high blackness. When tested as mentioned above, Dispersants 21 to 39 also produced the same effect as Dispersant 20.

The same superior effect as mentioned above was produced when the dispersant was neutralized with rosin amine, coconut amine, coconut propylene diamine, or hydroxide of calcium, strontium, or aluminum in place of beef tallow propylene diamine.

The yellow ink, red ink, blue ink, and black ink prepared in this example were used as a four-color process ink for offset litho printing to give a bright beautiful multicolor printed matter.

EXAMPLE 7

A blue quick drying enamel (air drying type) for metallic materials (e.g., machines and vehicles) was produced according to the following formulation.

| | |
|---|---|
| Flushed color (pigment = 50%) of copper phthalocyanine blue obtained in Example 5 | 10.8 parts |
| Rutile titanium white | 2.0 parts |
| Fast drying styrenized alkyd resin | 72.6 parts |
| Xylene | 6.6 parts |
| Mineral spirit | 7.6 parts |
| 6% cobalt naphthenate | 0.3 parts |
| Antiskinning agent | 0.1 parts |
| Total | 100.0 parts |

The resulting enamel provided bright beautiful coatings.

Flushed colors were prepared in the same manner as in Example 5 from an aqueous filter cake of disazo yellow pigment (C.I. pigment yellow 14), fast yellow pigment (formed by coupling acetoacetanilide by diazotizing 4-aminophthalimide), watching red pigment (C.I. pigment red 48), and carmine FB pigment (C.I. pigment red 3). The flushed colors were made into paints of varied colors according to the above-mentioned formulation. The paints gave bright beautiful coate plates.

EXAMPLE 8

A dispersion of copper phthalocyanine blue (C.I. pigment blue 15-3) in a xylene-butanol mixed solvent was prepared by dispersing the pigment using a continuous horizontal medium dispersing machine according to the following formulation.

| | |
|---|---|
| Copper phthalocyanine blue pigment (dried and pulverized) | 10 parts |
| Salt of Dispersant 20 obtained in Referential Example 20 (neutralized with about one equivalent of triethylamine) | 2 parts |
| Xylene | 13 parts |
| Butanol | 5 parts |
| Total | 30 parts |

The resulting dispersion was made into an acrylic lacquer enamel for automobiles according to the following formulation.

| | |
|---|---|
| Solvent dispersion above-mentioned | 3.0 parts |
| Rutile titanium white | 14.0 parts |
| Thermoplastic acrylic resin | 70.0 parts |
| Toluene | 6.8 parts |
| Xylene | 3.2 parts |
| Butanol | 2.2 parts |
| Cellosolve | 0.8 parts |
| Total | 100.0 parts |

The resulting enamel provided bright beautiful coatings.

When tested as mentioned above. Dispersants 21 to 39 also produced the same effect as Dispersant 20.

The same superior effect as mentioned above was produced when the dispersant was neutralized with rosin amine, coconut amine, beef tallow propylene diamine, coconut propylene diamine, or hydroxide of calcium, strontium, or aluminum, in place of triethylamine.

What is claimed is:

1. A pigment composition composed of a pigment and a dispersant characterized in that the dispersant is a phosphoric ester compound represented by the formula

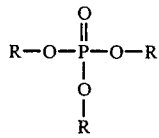

where at least one R is a polyester residue derived from a hydroxy-terminated polyester obtained by self-polycondensation of a hydroxy-carboxylic acid, and any remaining R is a hydrogen atom, a cation, or a residue of an alcohol.

2. A pigment composition as set forth in claim 1, which further comprises a solvent and resin binder.

3. A pigment composition as set forth in claim 1, wherein one R is the polyester residue derived from the hydroxy-terminated polyester obtained from a hydroxy-carboxylic acid.

4. A pigment composition as set forth in claim 1, wherein two of the R's are the polyester residues derived from the hydroxy-terminated polyester obtained from a hydroxy-carboxylic acid.

5. A pigment composition as set forth in claim 1, wherein each R is the polyester residue derived from the hydroxy-terminated polyester obtained from a hydroxy-carboxylic acid.

6. A pigment composition as set forth in claim 1, wherein the hydroxy-termianted polyester is a polyester obtained from at least one of hydroxy-carboxylic acid selected from the group consisting of ricinolic acid, hydroxystearic acid, castor oil fatty acid, hydrogenated castor oil fatty acid, hydroxyvaleric acid, hydroxycaproic acid, hydroxy-ethyloxybenzoic acid, and hydroxynaphthalene-carboxylic acid.

* * * * *